(12) United States Patent
Xia et al.

(10) Patent No.: US 12,527,970 B2
(45) Date of Patent: Jan. 20, 2026

(54) PHOTOBIOMODULATION DEVICE FOR TREATING RETINAL DISEASE

(71) Applicant: ELLEX MEDICAL PTY LTD., Mawson Lakes (AU)

(72) Inventors: Wei Xia, Mawson Lakes (AU); Victor Previn, Mawson Lakes (AU); Robert Casson, North Adelaide (AU)

(73) Assignee: ELLEX MEDICAL PTY LTD., Mawson Lakes (AU)

( * ) Notice: Subject to any disclaimer, the term of this patent is extended or adjusted under 35 U.S.C. 154(b) by 0 days.

(21) Appl. No.: 16/768,338

(22) PCT Filed: Dec. 4, 2018

(86) PCT No.: PCT/AU2018/000246
§ 371 (c)(1),
(2) Date: May 29, 2020

(87) PCT Pub. No.: WO2019/109125
PCT Pub. Date: Jun. 13, 2019

(65) Prior Publication Data
US 2020/0360722 A1    Nov. 19, 2020

(30) Foreign Application Priority Data
Dec. 4, 2017    (AU) .............................. 2017904873

(51) Int. Cl.
*A61N 5/06* (2006.01)
*A61N 5/067* (2006.01)

(52) U.S. Cl.
CPC .... *A61N 5/0622* (2013.01); *A61N 2005/0643* (2013.01); *A61N 2005/0652* (2013.01);
(Continued)

(58) Field of Classification Search
CPC ........ A61F 2009/00863; A61N 5/0622; A61N 5/067; A61N 2005/0643;
(Continued)

(56) References Cited

U.S. PATENT DOCUMENTS

RE38,590 E    9/2004 Sumiya
9,037,217 B1 *  5/2015 Peyman ................. A61B 18/20
                                                 600/427
(Continued)

FOREIGN PATENT DOCUMENTS

CN    1631345 A    6/2005
CN    102715981 A    10/2012
(Continued)

*Primary Examiner* — Niketa Patel
*Assistant Examiner* — Skylar Lindsey Christianson
(74) *Attorney, Agent, or Firm* — Robert C. Netter, Jr.; Dann, Dorfman, Herrell & Skillman (57) ABSTRACT

An ophthalmic treatment device for photobiomodulation of a retina comprising: a treatment light source producing a continuous wave or quasi-continuous wave output beam having a wavelength in the range of 600 nm to 1000 nm and a power in the range of 1 mW to 500 mW; a beam homogenizing module that homogenizes the output beam of the treatment light source; a beam shaping module that modifies the output beam profile to produce a treatment light beam with an annular light beam profile; and a beam delivery and viewing module that allows an Operator to observe and operate to deliver the treatment light beam to the treatment location on the retina with an intensity in the range of 1 mW/cm$^2$ to 500 mW/cm$^2$.

18 Claims, 5 Drawing Sheets

(52) U.S. Cl.
CPC .......... *A61N 2005/0654* (2013.01); *A61N 2005/0659* (2013.01); *A61N 2005/0666* (2013.01); *A61N 5/067* (2021.08)

(58) Field of Classification Search
CPC .... A61N 2005/0652; A61N 2005/0654; A61N 2005/0659; A61N 2005/0666
See application file for complete search history.

(56) References Cited

U.S. PATENT DOCUMENTS

| | | |
|---|---|---|
| 2004/0215293 A1 | 10/2004 | Eels et al. |
| 2004/0233388 A1* | 11/2004 | Artsyukhovich ... A61F 9/00821 351/216 |
| 2005/0159793 A1* | 7/2005 | Streeter ............... A61F 9/00821 607/86 |
| 2007/0123844 A1 | 5/2007 | Henry |
| 2008/0086183 A1 | 4/2008 | Greenberg et al. |
| 2010/0004643 A1* | 1/2010 | Frey .................... A61F 9/00838 606/5 |
| 2010/0152716 A1 | 6/2010 | Previn et al. |
| 2010/0274232 A1* | 10/2010 | Bischoff ................. A61F 9/008 606/4 |
| 2011/0040235 A1 | 2/2011 | Castel |
| 2012/0083772 A1* | 4/2012 | Rubinfeld ............. A61K 38/44 606/4 |
| 2012/0170013 A1* | 7/2012 | Tsuji ....................... G03F 7/701 355/77 |
| 2012/0310141 A1 | 12/2012 | Kornfield et al. |
| 2013/0144363 A1* | 6/2013 | Plunkett ................ A61N 5/0613 607/89 |
| 2014/0194957 A1 | 7/2014 | Rubinfeld et al. |
| 2015/0196427 A1* | 7/2015 | Hutchison ................ G02B 3/08 606/4 |
| 2016/0236006 A1 | 8/2016 | Donitzky et al. |
| 2016/0271419 A1* | 9/2016 | Varghese ................. A61N 1/44 |
| 2017/0203132 A1* | 7/2017 | Luttrull ................. A61N 7/022 |

FOREIGN PATENT DOCUMENTS

| | | |
|---|---|---|
| JP | H05211 U | 1/1993 |
| JP | 2004221436 A | 8/2004 |
| WO | 2008/118198 A2 | 10/2008 |
| WO | 2009/019451 A1 | 2/2009 |
| WO | 2013/176810 A1 | 11/2013 |
| WO | WO-2016040534 A1 * | 3/2016 ........... A61F 9/0079 |

* cited by examiner

PHOTOBIOMODULATION DEVICE FOR TREATING RETINAL DISEASE

This application is a § 371 application of PCT/AU2018/000246, filed Dec. 4, 2018, which in turn claims priority to Australian Patent Application No. 2017904873, filed Dec. 4, 2017. The entire disclosure of each of the foregoing applications is incorporated by reference herein.

FIELD OF THE INVENTION

The present invention relates to the field of ophthalmology. More particularly, the invention relates to the use of red to near infrared light for treatment of a variety of eye impairments or diseases. The invention also relates to a treatment device for photobiomodulation.

BACKGROUND TO THE INVENTION

Photobiomodulation (PBM), also known as low level light therapy (LLLT), employs red to near-infrared (NIR) light at power densities a hundred times lower than conventional thermal treatments. LLLT promotes the healing of injured cells, including blood vessels and neurons in the retina. Animal model studies suggest that NIR treatment augments cellular energy metabolism, enhances mitochondrial function, increases cytochrome C oxidase activity, stimulates antioxidant protective pathways and promotes cell survival.

There is evidence that light at 670 nm activates cytochrome C oxidase, a key constituent of the mitochondrial electron transport chain, which subsequently results in increased electron transfer and improved mitochondrial respiration and ATP synthesis. NIR treatment has recently been reported to attenuate neuronal damage in animal models of retinal degenerations and regulates mitochondrial function through increasing mitochondrial membrane potentials for ATP production, thus inhibiting neuronal apoptosis and neuroinflammation and improving glial-neuronal interactions For LLLT it is known to employ a device with an LED array and place it a couple of centimetres in front of a patient's eye to deliver red to near-infrared light directly through the pupil or through the eye lid and ocular segments to the retina without the aid of any focusing optics.

As the light emitted from the LED array is divergent at a large angle, the intensity of light that reaches the retina varies significantly depending on the distance between the light emitting surface and the eye. Moreover, even though some of the devices have beam collimating optics, the power loss through the open or closed eye lid, cornea, and pupil are highly variable since the eyelid diffuses and attenuates a majority of incident light, and an undilated pupil also limits a large amount of light from passing through. Therefore, light transmission to the retina varies greatly depending on the state of closure of the eyelid and the size of pupil. In other words, the power of treatment light reaching the retina is unknown and uncontrollable when using a LED array.

One such device is described in U.S. Pat. No. 9,592,404 assigned to Photospectral Health Sciences Inc. This patent suggests that light for the treatment should be set at much higher intensity and energy than is needed to accomplish the selected dosage because the light will first pass through the closed eyelid of the patient before reaching the patient's retinal tissue, while it is only set to be slightly higher if the eyelid is to remain open during treatment. Here the words 'much higher' 'slightly higher' are inexplicit for controlling the dosage.

Another device is described in U.S. Pat. No. 9,192,780 assigned to L'Oreal SA. This patent describes an LED device with output radiant exposure of up to 4 $J/cm^2$ but acknowledges that the retinal target only receives 1 $nJ/cm^2$ to 1 $J/cm^2$.

Other devices are described by Dotson et al (U.S. Pat. No. 9,592,404 B2) and Tedford et al (WO2016/040534 A1). Both teach that in some embodiments the patient's eye remains closed during treatment using a LED device and in other embodiments the patient's eye remains open. The former claims a fluence of at least $10^{-2}$ $J/cm^2$. The latter claims a huge range from 0.01 $\mu J/cm^2$ to 1 $J/cm^2$.

A method of treatment using such a device is described by Eells et al (US2004/0215293) which uses a LED device positioned 2.5 cm from an eye of a patient for retinal treatment. The patient's eye with a closed eyelid is exposed to the LED device with a surface power intensity of 25-50 $mW/cm^2$ for 1-3 minutes to produce a radiant fluence of 4 $J/cm^2$.

In order to determine the actual energy delivery from a LED device through the entire ocular segments onto a retina, we conducted measurements using a LED device and an eye model. A Quantum WARP 10 LED array with output light at 670 nm wavelength and surface power intensity of 50 $mW/cm^2$ was used as the light source, as it has been previously used for photobiomodulation studies for improving retinal functions. An optical system was built to mimic a human eye. A diffuser positioned 20 mm from the LED device mimicked the eyelid, an aperture with a hole diameter of $\phi 3$ mm (undilated pupil diameter 2-4 mm), $\phi 6$ mm or $\phi 8$ mm (dilated pupil 6-8 mm) positioned immediately behind the diffuser mimicked the undilated or dilated pupil respectively. An optical lens with a focal length of 20 mm (FL20) or 15 mm (FL15) positioned immediately behind the aperture mimicked the cornea and the crystalline lens in a relaxed or a constricted state, and a paper target positioned 15-20 mm behind the optical lens represented the retina. A Newport power meter 1918C was used for measuring the power emission directly from the LED device and at various locations of the optical system. The measurements using this simplified system ignore the defects of a human diseased eye, such as cloudy crystalline lens which attenuates the incident light through to the retina.

The measurement of power directly from the LED device at various distances shows that the intensity decreases significantly from 50 $mW/cm^2$ at the device surface to 22.3 $mW/cm^2$ at a distance of 20 mm, 16.0 $mW/cm^2$ at 30 mm and 10.7 $mW/cm^2$ at 40 mm.

Measurements Without Having The Diffuser In Place (Open Eyelid)

The power of light passing through the aperture, $\phi 3$ mm, $\phi 6$ mm or $\phi 8$ mm, positioned 20 mm from the LED device was measured using the power meter positioned 15 mm behind the aperture. The intensity was calculated as 6.5 $mW/cm^2$, 4.0 $mW/cm^2$ and 1.5 $mW/cm^2$ for the $\phi 8$ mm, $\phi 6$ mm and $\phi 3$ mm apertures respectively.

The power of light passing through the aperture and the optical lens was measured with the power meter positioned 15-20 mm behind the lens. The intensity was calculated as 4.66-7.08 $mW/cm^2$, 2.95-4.45 $mW/cm^2$ and 0.96-1.47 $mW/cm^2$ using the $\phi 8$ mm, $\phi 6$ mm and $\phi 3$ mm apertures respectively for lens FL20. The lens FL15 has a small aperture of 5 mm. The intensity using the lens FL15 was calculated as 1.42-3.48 mW/cm2 and 0.84-1.28 mW/cm2 through the φ5 mm and φ3 mm apertures respectively. The light intensity was 22.3 mW/cm² at the aperture positioned 20 mm from the LED device. The efficiency of light transmission through to the paper target was calculated as 20.9%-31.7%, 13.2%-20.0% and 4.3%-6.6% using the φ8 mm, φ6 mm and φ3 mm apertures respectively for lens FL20. The efficiency was 6.4%-15.6% and 3.8%-5.7% through the φ5 mm and φ3 mm apertures respectively.

It is known that for an eye exposed to bright light, the pupil is normally constricted which results in further decrease of intensity delivered on the retina. Tedford et al (WO2016/040534) describe measurements of light intensity from a LED device through cadaver eyes at various locations of the ocular system for both conditions of open and closed eyelid. For open eyes, the intensity drops from 171.51±6.68 mW/cm² at the cornea surface to 17.81±5.73 mW/cm² at the posterior chamber close to the retina, about 10% of efficiency. This value agrees well with the above measurements between the range of using the φ3 mm aperture and the φ6 mm aperture. The differences are attributed to the use of cadaver eyes as the measurement samples. Firstly, the pupil dilates after death due to the relaxation of muscles, which tends to allow more light pass through compared to undilated eyes. Secondly, both cornea and lens become opaque after hours of death, which attenuates the passing light on the other hand.

Measurements Having The Diffuser In Place (Closed Eyelid)

Bierman et al (*J. Biomed Opt*, 16(6) 2011) reported a measurement on live human eyelids of 10% transmittivity at a wavelength range of 650-700 nm. Therefore, the light delivery on the retina is calculated as only 0.10-0.15 mW/cm² through an undilated eye of 3 mm pupil diameter with the eyelid closed. It is only 0.2%-0.3% of the LED device surface intensity 50 mW/cm² proclaimed in the research reports or patents using a LED array device for eye treatment, such as US2004/0215293.

Further to the power measurement, the profiles of LED light projected on the paper target through the aperture and lens are significantly different at the settings with and without using the diffuser. Without using a diffuser, the individual light sources of the LED array are imaged by the aperture (3 mm) and the lens forms discrete spots. The diameter of each individual spot projected on the target varies with the size of the aperture. The smaller the aperture size the smaller the spot diameter. When a diffuser is placed in front of the aperture the LED light is diffused and projected onto the paper target as one uniform and dim spot. This simulation outcome is identical to the patient's observation of the LED device positioned 2-3 cm from the eye with eyelid open or closed. It is clear that whether the eye is open or closed results in significant difference in not only the total power but also the distribution of the power. As a consequence, it may lead to significantly different clinical effects.

Furthermore, when using an LED device without an integrated viewing system, a doctor is unable to look into the eye of the patient during treatment. Which part of the retina receives radiant exposure is not precisely known, nor is the actual fluence delivered to the retina. The potential for the treatment to either deliver no useful effect at all, or to cause damage, is high.

The retina is a sensitive part of the human eye, especially in the macular area for central vision, on which over dosage of light exposure may result in permanent damage to the eye, leading to blindness in serious cases, while under dosage will not generate clinical effects. An accurate control of the power delivered on the targeted location of the retina is critical for a safe and effective treatment of retinal diseases. There is a need for a better device and method to deliver red to near infrared light treatment with well controlled power delivery and spot size on a patient's retina.

SUMMARY OF THE INVENTION

In one form, although it need not be the only or indeed the broadest form, the invention resides in an ophthalmic treatment device for accurate delivery of treatment light to a retina for photobiomodulation comprising: a treatment light module producing a continuous wave or quasi-continuous wave output beam having:
  a wavelength in the range of 600 nm to 1000 nm; and
  a power in the range of 1 mW to 250 mW;
a beam homogenizing module that homogenizes the output beam of the treatment light module to produce a uniform beam profile;
a beam shaping module that modifies the uniform beam profile to produce a treatment light beam with an annular light beam profile; and
a beam delivery and viewing module that delivers the treatment light beam to the retina with an intensity in the range of 1 mW/cm² to 500 mW/cm².

Preferably the treatment light module is operated at a wavelength range between 600 nm and 900 nm.

The light intensity is preferably between 1 mW/cm² to 250 mW/cm². The light intensity is selected to avoid thermal damage to tissue.

The annular treatment light beam profile preferably has a central void with a diameter of 1.0 mm to 2.5 mm and most preferably 1.5 mm to 2.0 mm. The outer diameter of the annular profile is preferably 4.5 mm to 10 mm and most suitably 4.5 mm to 6.0 mm.

The ophthalmic treatment device may further comprise a beam selector operable to select between beam profiles. The beam selector may select beam profiles from one or more annual beams with different size voids and may select a solid uniform beam.

The ophthalmic treatment device may include a timer for exposure control in the range 1 second to 300 seconds, or preferably 1 second to 180 seconds.

In a further form the invention resides in a method of treating retinal disorders by photobiomodulation including the steps of:
  selecting a treatment area of the retina;
  selecting a treatment light beam profile for treating the treatment area of the retina;
  delivering a treatment light beam having the light beam profile onto the treatment area for a period of time between 1 second and 300 seconds;
  wherein the treatment light beam has a wavelength in the range 600 nm to 1000 nm and an intensity in the range 1 mW/cm² to 500 mW/cm²;
  and wherein the treatment area is an area around a fovea or an optic disc and the treatment light beam profile is an annular beam profile.

The method may include the further step of selecting a further treatment area that is not around the fovea or optic disc wherein the light beam profile is a solid uniform beam profile.

The method may include the further step of selecting the dimensions of the annular beam profile or the solid uniform beam profile.

Suitably the annular beam profile is located on the retina such that a central void of the annulus is centred on the fovea or the optic disc of the retina.

The method preferably is limited to a treatment time of between 1 second and 180 seconds. The wavelength is suitably between 600 nm and 900 nm and the intensity is suitably between 1 mW/cm$^2$ and 250 mW/cm$^2$.

Further features and advantages of the present invention will become apparent from the following detailed description.

BRIEF DESCRIPTION OF THE DRAWINGS

To assist in understanding the invention and to enable a person skilled in the art to put the invention into practical effect, preferred embodiments of the invention will be described by way of example only with reference to the accompanying drawings, in which.

DETAILED DESCRIPTION OF THE INVENTION

Embodiments of the present invention reside primarily in a photobiomodulation device and a method of using the treatment light for treating retinal disorders. Accordingly, the elements have been illustrated in concise schematic form in the drawings, showing only those specific details that are necessary for understanding the embodiments of the present invention, but so as not to obscure the disclosure with excessive detail that will be readily apparent to those of ordinary skill in the art having the benefit of the present description.

In this specification, adjectives such as first and second, left and right, and the like may be used solely to distinguish one element or action from another element or action without necessarily requiring or implying any actual such relationship or order. Words such as "comprises" or "includes" are intended to define a non-exclusive inclusion, such that a process, method, article, or apparatus that comprises a list of elements does not include only those elements but may include other elements not expressly listed, including elements that are inherent to such a process, method, article, or apparatus.

Figure 1:
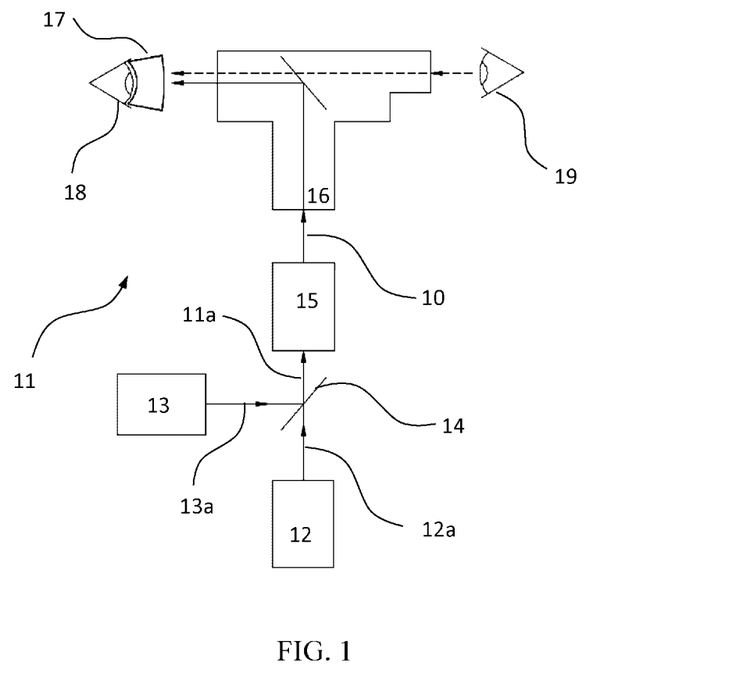
FIG. 1 is a block diagram of a treatment device according to the present invention.

Referring to FIG. 1 there is a shown a block diagram of a treatment device 11 suitable for low level light therapy, such as photobiomodulation for treatment of ophthalmic disorders including diabetic retinopathy (DR), diabetic macular edema (DME) and age related macular degeneration (AMD). The treatment device 11 consists of a treatment light source 12 which emits treatment light radiation in a treatment beam 12a at a wavelength range from about 600 nm to about 1000 nm, that is the say, in the red to near infrared region. A suitable treatment light source is a laser, a light emitting diode (LED), a lamp, or any alternative sources at 600 nm-1000 nm radiation. The output power is suitably in the range of 1 mW to 250 mW. Persons skilled in the art will understand that this does not preclude the use of light sources capable of generating a higher power output but operated to produce a power output in the therapeutic range suitable for photobiomodulation. The light source suitably produces a continuous wave (CW) output, or may produce a quasi-CW output, that is to say a continuous train of pulses.

An aiming light module 13 is provided and delivers a visible beam 13a to assist an Operator to aim the treatment light beam. A suitable aiming light module is a diode laser operating at 635 nm set to a power well below a therapeutic dose typically in the range of 1 to 100 microwatts. Alternatively, an aiming light with a wavelength outside the red range, for example 515 nm being green, could be a suitable option.

The treatment beam 12a and aiming beam 13a are combined into a single beam 11 a by a beam combiner 14.

The beam 11a is transformed into a uniform profile by beam homogenizing module 15 as described in detail below. The uniform beam is delivered to a beam delivery and viewing module 16 which directs the beam through an optional contact lens 17 to the eye 18 of a patient. An Operator 19, most often a doctor, also views the eye 18 through the beam delivery and viewing module 16.

Figure 2:
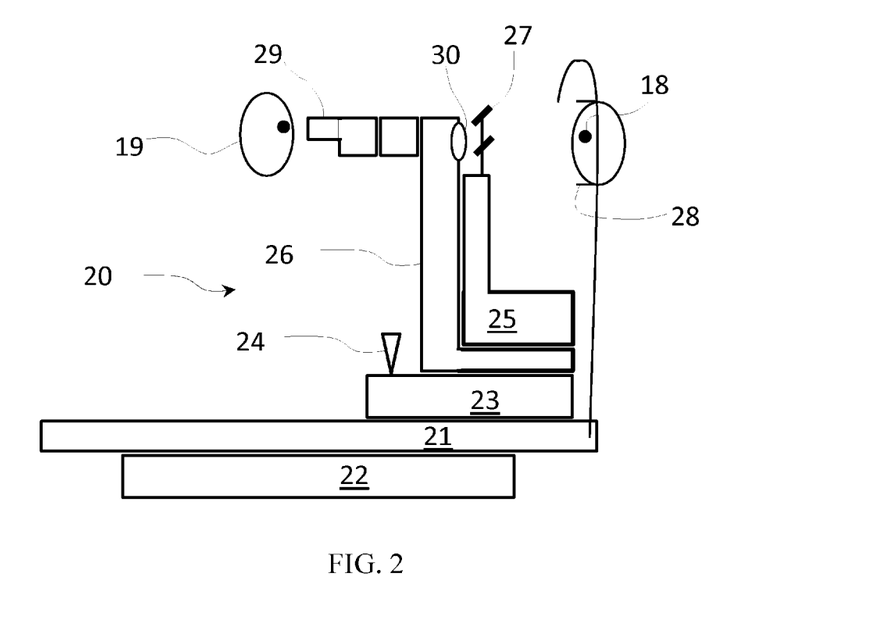
FIG. 2 is a sketch of the implementation of the treatment device of FIG. 1 with a slit lamp.

The treatment device 11 is conveniently integrated into a slit lamp assembly 20, as shown in FIG. 2. The slit lamp assembly 20 consists of a table 21 with some components of the system, such as power supplies, arranged in a console 22 located beneath the table 21. A slit lamp base 23 is movable on the table 21 using a joystick 24. A slit lamp 25 and a delivery head 26 are located on the base 23 and move with it. The eye 18 of the patient is fixed by the patient resting on a chin rest 28 that is attached to the table 21. Binoculars 29 are provided for viewing by the Operator 19.

The optical path for the Operator 19 is through binoculars 29, safety filter (not shown) and objective lens 30 to the eye 18 of the patient (and possible through optional contact lens 17). The light path is through the delivery head 26 and objective lens 30 (and possible through optional contact lens 17) to the eye 18. The aiming beam path is also through the delivery head 26 and objective lens 30 (and possible through optional contact lens 17) to the eye 18. An illumination light beam (not shown) from the slit lamp 25 is directed by one or more mirrors 27 to provide illumination to the eye 18.

Figure 3:
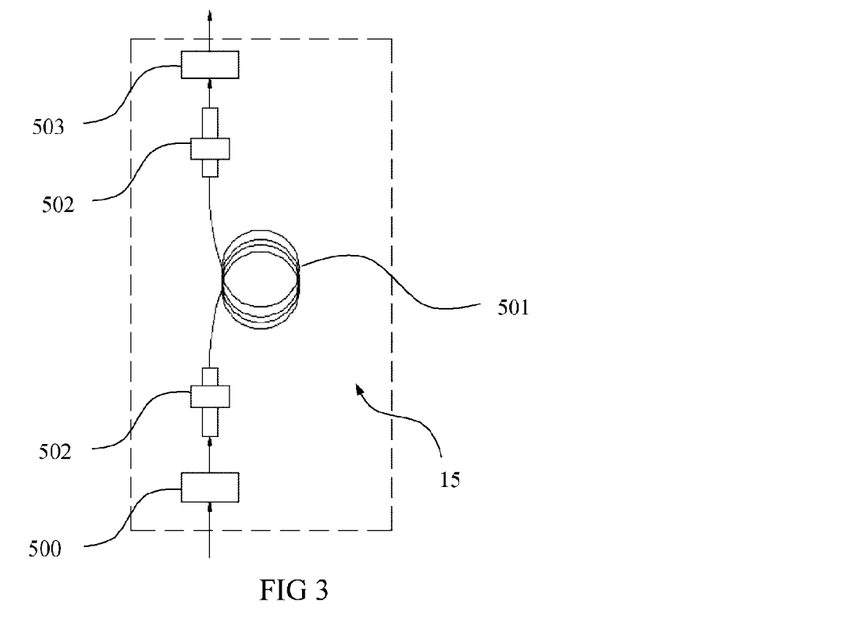
FIG. 3 is a sketch of the elements of an embodiment of a beam homogenizing module.

Referring to FIG. 3, the beam homogenizing module 15, in one embodiment, includes a focus lens 500 that couples the beam 11 a into a multimode optical fibre 501. Both ends of the optical fibre 501 are terminated by fibre connectors 502. When the treatment light is transmitted through the optical fibre, multiple propagation modes of the fibre reform the treatment light beam into a uniform profile. The output treatment light beam from the optical fibre 501 may be collimated by an optional collimating lens 503. The optical fibre 501 may be 50-1000 microns in core diameter, preferably, 200-600 microns.

FIG. 3 shows only one possible embodiment for the beam homogenizing module 15. Another option is a diffractive optical element such as a top-hat beam shaper or homogenizer. The beam homogenizing module 15 could also employ a refractive optical element or a diffusive element.

Figure 4:
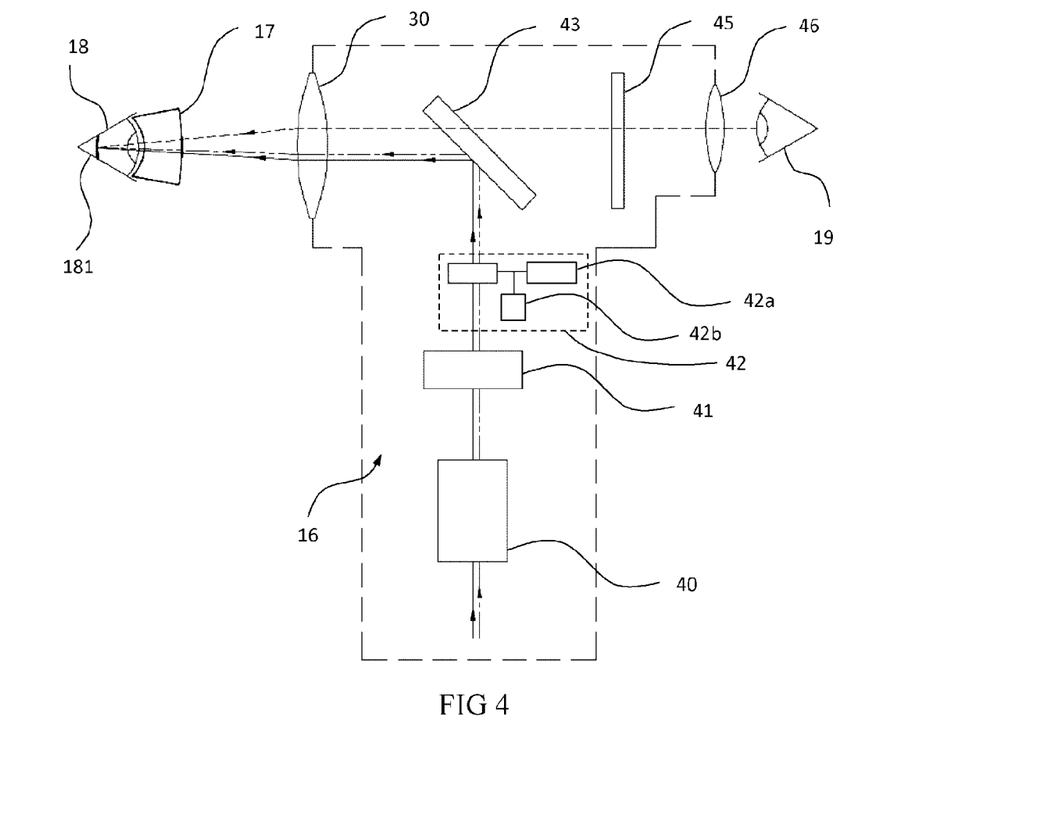
FIG. 4 is a sketch of the elements of a beam delivery and viewing module.

Referring to FIG. 4, the beam delivery and viewing module 16 consists of an optical zoom module 40, a collimating lens 41, a beam shaping module 42, a folding mirror 43, an objective lens 30, an eye safety filter 45 and a pair of binocular eyepieces 46 forming the binocular 29.

The zoom module 40 controls the spot size of the treatment light focused on the patient's retina 181. The collimating lens 41 collimates the output beam from the zoom module 40.

Figure 9:
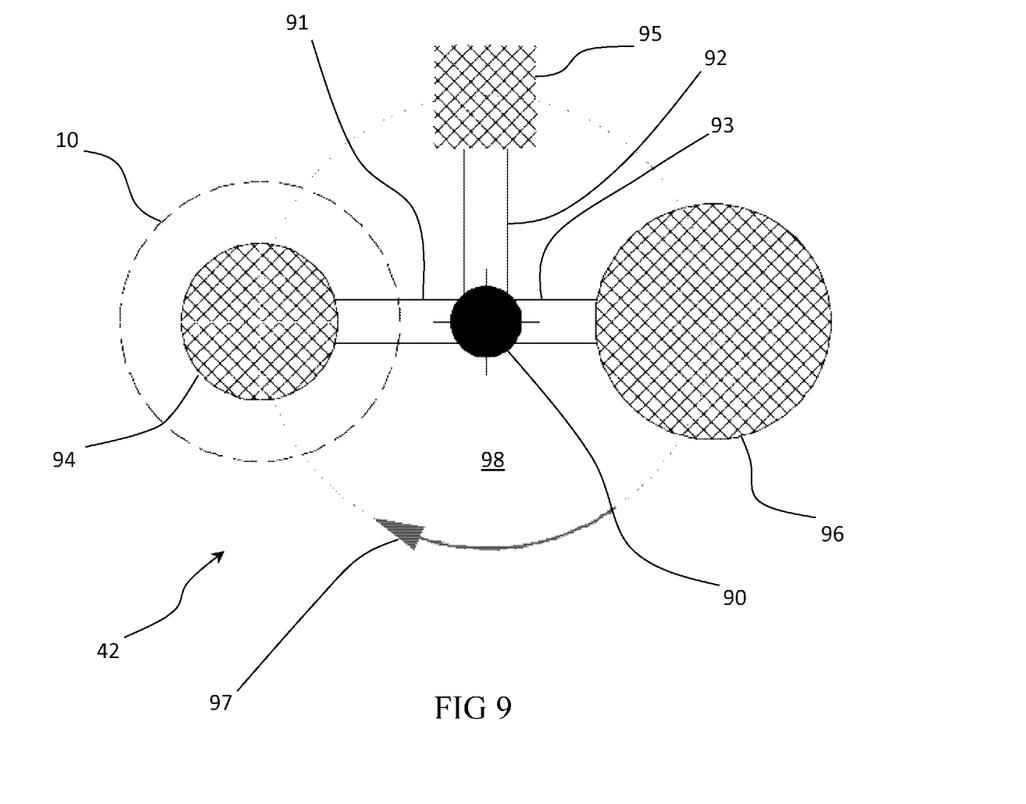
FIG. 9 shows a schematic of an embodiment of a variable mask.

The beam shaping module 42 consists of one or more beam shaping elements 42a and an actuator 42b. The one or more beam shaping elements 42a may have various designs to shape the treatment light beam to an annular shape with a central void of various shapes and sizes. The one or more beam shaping elements are arranged on a wheel (detailed in FIG. 9). The wheel is driven by the actuator 42b to rotate so as to select one of the beam shaping elements and position it centred in a collimated light beam path 47. One position on the wheel is an open space for the delivery of a solid uniform beam to the patient's eye 18, without the beam shaping element in place.

Figure 5:
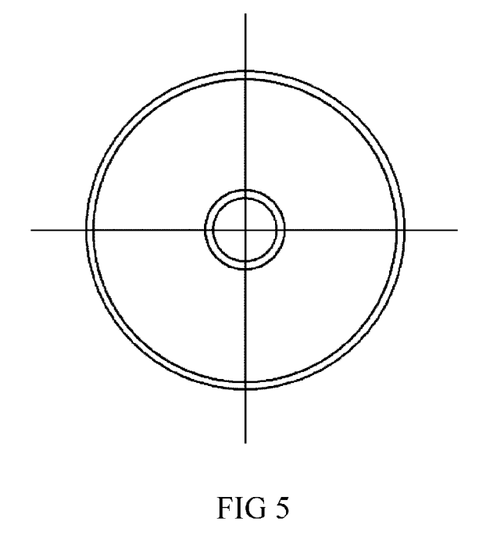
FIG. 5 shows the output beam profile of the treatment device and slit lamp combination of FIG. 2.

In one embodiment the beam shaping element includes a mask. The mask is located in the collimating path of the light beam to block the central part of the light beam thus forming an annular profile as shown in FIG. 5. The mask may be optically opaque materials to the light in the range of 600 nm-1000 nm. The size of the mask is designed so that the inner diameter of the annular beam is greater than the diameter of the fovea or the optic disc of an eye to be treated. The fovea and the optic disc are known to be particularly sensitive so masking the central portion of the treatment light beam avoids the risk of damage while allowing treatment of the surrounding retina.

The beam shaping element 42a, in another embodiment, may be a vortex phase plate which converts a solid treatment light beam into an annular beam.

The beam shaping element 42a, in another embodiment, may be a LCD array, or a micro mirror, or a number of alternative spatial light modulators.

Folding mirror 43 redirects the combined light beam 11a towards the patient's eye 18. The folding mirror 43, in one embodiment, is a narrow mirror that redirects the light beam 11a without blocking the view path of the operator 19. In another embodiment the folding mirror 43 is a dichroic mirror that fully reflects the treatment light beam 12a, partially reflects the aiming beam 13a but allows the operator 19 to see through and observe the aiming beam projection on the retina.

The objective lens 30 focusses the light beam 11a onto the patient's retina 181 through the contact lens 17 which is temporarily adhered to the patient's eye with a high viscosity topical gel such as Genteal Gel (available from Novatis).

The contact lens assists in three ways. Firstly, it serves to match the slitlamp optics to the optics of the patient's eye in order to permit the projection of the light beam onto the retina. Secondly, the adhesion of the contact lens to eye permits the Operator to take control of the eye to accurately direct and maintain pointing of the treatment light energy accurately on target. Thirdly the contact lens prevents the eyelid from closing hence maintaining uninterrupted accuracy of dose delivery.

The Operator 19 views through the eyepiece 46, safety filter 45 and contact lens 17 to observe the patient's retina 181 and place the annular beam accurately to the treatment location on the retina 181. The safety filter 45 protects the Operator 19 from being exposed to scattered treatment light.

The treatment device optionally includes a camera that observes the patient's retina and manages a treatment location and a treatment time to ensure a required dose of treatment light is delivered.

Figure 6:
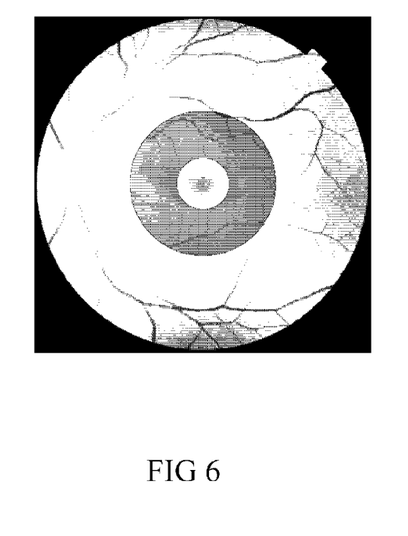
FIG. 6 shows the beam of FIG. 5 located on an eye.

FIG. 6 shows an annular light spot delivered on the retina. The inner diameter is 1.5 mm and the outer diameter is 4.5-6.0 mm. The power distribution is uniform in the annular beam. The specific dimension of the annular light beam is adjusted for the specific treatment so the inner diameter may be varied by a few tenths of a millimetre between 1.5 mm and 2.0 mm. Similarly, the outer diameter is varied in the range 4.5 mm to 6.0 mm to suit a specific treatment.

For the treatment of retinal disease, such as diabetic macular edema, the treatment light spot is located on the macular. The void of the annular treatment light spot, having no energy in the centre, serves to protect the fovea (diameter of around 1.5 mm) at the centre of the macular from treatment light exposure. The outer diameter of the annular beam covers the entire macular area (diameter of around 4.5-6.0 mm). For the treatment of retina around the optic disc (diameter of around 1.8 mm), the void of the annular beam has no irradiation and protects the optic disc from treatment light irradiation. The uniform power distribution of the annular beam enables even light exposure within the macular to avoid damage to tissue in the most sensitive part of the retina from any hot spots.

The treatment time may be varied by controlling operation of the treatment light source or by using a beam blocker (not shown), or a treatment time management feedback from the camera mentioned above. Persons skilled in the art will appreciate that there are a number of ways to control the duration of exposure for light treatment. In one simple technique the treatment light control includes a timer with a start button that initiates irradiation. Irradiation ceases at the end of the selected time. The same outcome is achieved by moving a beam block into the path of the treatment beam after a period determined by a timer.

Figure 7:
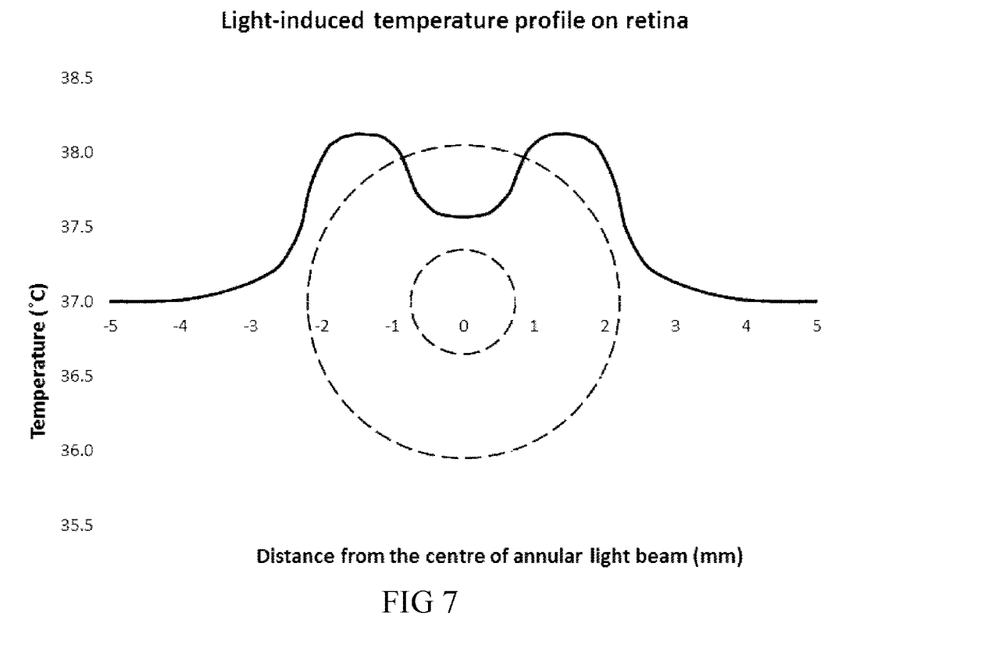
FIG. 7 shows the thermal profile induced by the beam of FIG. 5.
Figure 8:
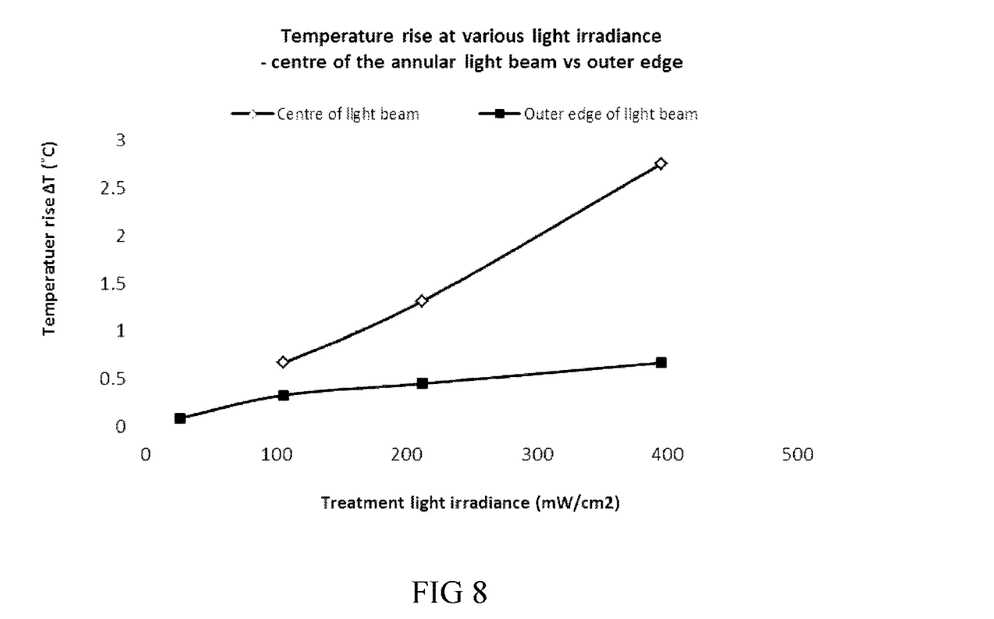
FIG. 8 shows a graph of temperature at a centre of the beam of FIG. 5 and at an outer edge of the beam of FIG. 5, for various treatment light powers.

The effectiveness of the innovation is shown in the data of FIG. 7 and FIG. 8. FIG. 7 shows the result of thermal dynamic modelling of the temperature profile taken at a cross-section through a centre of the annular light beam on the retina of a human eye. The graph shows that the neutral temperature is 37.0° C. which rises to 38.1° C. at the middle of the annulus but only reaches 37.5° C. in the central void. The parameters of the modelling were irradiation for 90 seconds with an annular light beam having an intensity of 200 mW/cm$^2$. The total radiant fluence is 18 J/cm$^2$.

In order to verify the modelling results various measurements were made on irradiation of bovine eye. For temperature measurement a bovine eye was sectioned equatorially through the sclera. The cornea and natural lens were removed together with some anterior vitreous however most of the vitreous was spared and the retina was kept intact. The eye was mounted in a supine orientation and the treatment light beam was directed onto the supine sectioned eye. Two small thermocouples (Ø0.85 mm) were connected to an Agilent 34970A Data Acquisition/Switch Unit for monitoring the real time temperature change during the light exposure. One thermocouple was inserted through the vitreous and placed directly in contact with the retina at the location corresponding to the central point of the annular light beam; and the second one was placed adjacent to the outer diameter of the annular light beam.

FIG. 8 shows the temperature change at each thermocouple for light irradiance of 25 mW/cm$^2$, 100 mW/cm$^2$, 200 mW/cm² and 375 mW/cm². As is clearly evident from the data the temperature rise at the center of the void remains less than 3° C. at all power levels. There are a number of differences between the thermal model of FIG. 7 and the bovine measurements of FIG. 8. These are:

The thermal model is constructed based on human retinal tissue properties which are slightly different from those of a bovine's eye;

The thermal model has considered effect of choroidal blood circulation that helps take a portion of heat away from the tissue;

As the bovine's eye used for the test is an explant without choroidal blood circulation, accumulation of heat presents.

In a further embodiment of the invention the desired beam profile is selected from a number of available shapes. Referring to the FIG. 9 there is shown an embodiment of the beam shaping module 42 in the form of a wheel with a number of masks at different locations around the wheel. The beam shaping module 42 comprises a central pivot 90 with a number of arms, 91, 92, 93 radiating outwards. At the end of arm 91 is a mask 94 that produces an annular beam profile as described above. For reference the diameter of the light beam 10 after the beam homogenizer module 15 is shown. The end of arm 92 is a square mask 95 that produces a different beam profile that may have application in other forms of retinal treatment. At the end of arm 93 is a larger disk 96 which produces a narrow annular beam. The arms are rotated about the central pivot in the direction of the arrow 97 either manually or by means of an actuator, such as a motorized device (not shown). It will be noted that there is a space 98 without a mask. This allows the Operator to select a solid beam for some treatments. Thus, with the embodiment of FIG. 9, the Operator 19 is able to use a beam selector (not shown) to select between various operating modes including a solid beam, annular beams with various dimensions, or shaped beams such as square. The beam selector may be a push button or any other suitable device to control the motion of the actuator for rotating and locating a selected beam shaping element in the light path.

Persons skilled in the art will appreciate that the ability to select a beam profile is not limited to selection of a mask but can equally well be implemented for the other beam shaping techniques mentioned above. Furthermore, it will be appreciated that a rotating wheel is not the only suitable manner of selection. For instance, directing the beam along a different beam path will also be workable.

The ability to select the beam profile, together with the ability to zoom the size of the spot on the retina and the ability to set the treatment duration, makes the invention extremely versatile for ophthalmic applications.

The device and method of treatment provides significant advantage compared to the previously known techniques for photobiomodulation. The treatment can be carefully controlled with known radiant fluence delivered to a known part of the eye for a known period of time. The treatment light beam profile is well controlled with a central void that minimizes the risk of damage to the fovea or to the optic disc.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. Accordingly, this invention is intended to embrace all alternatives, modifications and variations of the present invention that have been discussed herein, and other embodiments that fall within the spirit and scope of the above described invention.

The invention claimed is:

1. An ophthalmic treatment device for photobiomodulation of a retina comprising:
   a treatment light source producing a continuous wave or quasi-continuous wave output beam having:
      a wavelength in the range of 600 nm to 1000 nm;
      and a power in the range of 1 mW to 500 mW;
   a beam homogenizing module that homogenizes the output beam of the treatment light source;
   a beam shaping module that modifies the output beam profile to produce a treatment light beam with an annular light beam profile;
   a beam delivery and viewing module that allows an Operator to observe and operate to deliver the treatment light beam to the treatment location on the retina with an intensity in the range of 1 mW/cm² to 500 mW/cm²; and
   an optical zoom module to control the size of the annular shape of the treatment light focused on the patient's retina, wherein the outer diameter of the annular light beam profile of the treatment light is varied by the optical zoom module,
   wherein the output beam is an annular light beam profile having a central void with an inner diameter of 1 mm to 2.5 mm on the retina or a central void with an inner diameter of 1.5 mm to 2 mm on the retina,
   wherein the beam shaping module includes (i) one or more beam shaping elements to shape the treatment light beam to an annular shape with a central void of various shapes and sizes, and (ii) an actuator, wherein the size and shape of the central void of the treatment light are varied by the beam shaping module,
   wherein the one or more beam shaping elements are arranged on a rotatable wheel driven by the actuator to rotate so as to select one of the beam shaping elements and position it centered in a collimated light beam path,
   wherein the one or more beam shaping element is a mask, which is located in the collimated light beam path to block the central part of the light beam thus forming an annular profile, and
   wherein both the selection of the beam profile by the beam shaping module and the zoom of the size of the annular shape of treatment beam spot by the optical zoom module increases the versatility of the ophthalmic treatment device.

2. The ophthalmic treatment device of claim 1, wherein the treatment light source is a laser, a light emitting diode (LED), or a lamp.

3. The ophthalmic treatment device of claim 1, wherein the treatment light source is operated at a wavelength range between 600 nm and 900 nm.

4. The ophthalmic treatment device of claim 1, wherein the treatment light intensity is between 1 mW/cm² to 250 mW/cm².

5. The ophthalmic treatment device of claim 1, wherein the treatment light intensity is selected to avoid thermal damage to tissue.

6. The ophthalmic treatment device of claim 1, wherein the homogenizing module further includes a multimode optical fiber, or a diffractive optical element, or a refractive optical element that reforms a light beam into a uniform profile.

7. The ophthalmic treatment device of claim 1,
wherein said mask is optically opaque to the light from the beam in a range of 600 nm-1000 nm, or
wherein at least one of the beam shaping elements is a LED array, or a micro mirror, or a vortex phase plate, or a number of alternative spatial light modulators.

8. The ophthalmic treatment device of claim 7, wherein said retina comprises a fovea and an optic disc, and wherein the at least one beam shaping element is designed so that the diameter of the central void of the annular beam on the retina is greater than a diameter of the fovea of the retina or the optic disc of the retina of an eye to be treated.

9. The ophthalmic treatment device of claim 1 wherein the actuator is a motor or a solenoid or an equivalent device that drives rotation of the rotatable wheel.

10. The ophthalmic treatment device of claim 1 further comprising a beam selector that selects an output beam profile by moving one of the beam shaping elements into a light optical path.

11. The ophthalmic treatment device of claim 1 wherein the output beam is an annular light beam profile having outer diameter of the annular profile in the range 4.5 mm to 10 mm on the retina or in the range 4.5 mm to 6 mm on the retina.

12. The ophthalmic treatment device of claim 1 wherein the output beam is a solid uniform beam having an outer diameter of 4.5 mm to 10 mm or having an outer diameter is 4.5 mm to 6 mm.

13. A method of treating retinal disorders by photobiomodulation, including the steps of:
selecting a treatment area of the retina;
selecting a treatment light beam profile for treating the treatment area of the retina;
delivering the treatment light beam via the beam delivery and viewing module of the ophthalmic treatment device of claim 1 having the treatment light beam profile onto the treatment area for a period of time between 1 second and 300 seconds;
wherein the treatment light beam has a wavelength in the range 600 nm to 1000 nm and an intensity in the range 1 mW/cm$^2$ to 500 mW/cm$^2$;
wherein the outer diameter of the annular light beam profile of the treatment light is varied by the optical zoom module;
wherein the size and shape of the central void of the treatment light are varied by the beam shaping module;
and wherein the treatment area is an area around a fovea or an optic disc and the light beam profile is an annular beam profile.

14. The method of claim 13 including the further step of selecting a further treatment area that is not around the fovea or optic disc wherein the light beam profile is a solid uniform beam profile.

15. The method of claim 13 wherein the annular beam profile has an inner diameter of 1 mm to 2.5 mm on the retina or an inner diameter of 1.5 mm to 2 mm on the retina.

16. The method of claim 13 wherein an outer diameter of the annular beam profile is 4.5 mm to 10 mm on the retina or is 4.5 mm to 6 mm on the retina.

17. The method of claim 13 wherein the annular beam profile is used for treating a macular with a central void of the annular beam protecting a fovea or an optic disc from treatment light exposure.

18. The method of claim 13, wherein said retina comprises a macula, and wherein the treatment light also has a solid uniform beam profile for treating an area outside the macula of the retina.

* * * * *